(12) United States Patent
Bergholz, Jr. et al.

(10) Patent No.: US 9,017,026 B2
(45) Date of Patent: Apr. 28, 2015

(54) TURBINE AIRFOIL TRAILING EDGE COOLING SLOTS

(75) Inventors: Robert Frederick Bergholz, Jr., Loveland, OH (US); Daniel Lee Durstock, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 494 days.

(21) Appl. No.: 13/438,296

(22) Filed: Apr. 3, 2012

(65) Prior Publication Data

US 2013/0259705 A1 Oct. 3, 2013

(51) Int. Cl.
*F01D 5/18* (2006.01)

(52) U.S. Cl.
CPC .......... *F01D 5/186* (2013.01); *F05D 2240/122* (2013.01); *F05D 2240/304* (2013.01); *F05D 2260/202* (2013.01); *F05D 2260/22141* (2013.01); *Y02T 50/673* (2013.01); *Y02T 50/676* (2013.01)

(58) Field of Classification Search
None
See application file for complete search history.

(56) References Cited

U.S. PATENT DOCUMENTS

| | | | |
|---|---|---|---|
| 4,303,374 A | 12/1981 | Braddy | |
| 4,601,638 A | 7/1986 | Hill et al. | |
| 5,368,441 A | 11/1994 | Sylvestro et al. | |
| 5,503,529 A | 4/1996 | Anselmi et al. | |
| 5,931,638 A | 8/1999 | Krause et al. | |
| 6,402,470 B1 | 6/2002 | Kvasnak et al. | |
| 6,612,811 B2 | 9/2003 | Morgan et al. | |
| 6,616,406 B2 | 9/2003 | Liang | |
| 6,969,230 B2 | 11/2005 | Shi et al. | |
| 7,246,999 B2 | 7/2007 | Manning et al. | |
| 7,371,048 B2 | 5/2008 | Downs et al. | |
| 7,641,445 B1 | 1/2010 | Liang | |
| 8,096,771 B2 | 1/2012 | Liang | |
| 2002/0187043 A1 | 12/2002 | Liang | |
| 2006/0133936 A1 | 6/2006 | Papple | |
| 2010/0074763 A1* | 3/2010 | Liang | 416/97 R |

FOREIGN PATENT DOCUMENTS

| | | |
|---|---|---|
| WO | 2009109462 A1 | 9/2009 |
| WO | 2013180795 A2 | 12/2013 |

OTHER PUBLICATIONS

PCT Search Report and Written Opinion dated Jan. 21, 2014, issued in connection with corresponding WO Patent Application No. PCT/US2013/033993.

* cited by examiner

*Primary Examiner* — Richard Edgar
(74) *Attorney, Agent, or Firm* — General Electric Company; William Scott Andes

(57) ABSTRACT

A turbine airfoil includes pressure and suction sidewalls extending along a span from a base to a tip. Spanwise spaced apart trailing edge cooling holes in the pressure sidewall end at corresponding spanwise spaced apart trailing edge cooling slots extending chordally substantially to the trailing edge. Each cooling hole includes a plug extending downstream through at least a portion of a spanwise diverging section leading into the slot. The plug may be spanwise centered in the hole and may include a plug dome rising up from a plug base extending along a suction sidewall surface of the suction sidewall. The cooling hole may further include an inlet leading to a metering section with a constant area and constant width flow cross section upstream of spanwise diverging section. Lands may be disposed between the trailing edge cooling slots forming slot floors between lands.

27 Claims, 9 Drawing Sheets

TURBINE AIRFOIL TRAILING EDGE COOLING SLOTS

BACKGROUND OF THE INVENTION

1. Field of the Invention

The present invention relates generally to gas turbine engine turbine airfoil cooling and, more specifically, to turbine airfoil trailing edge cooling slots.

2. Description of Related Art

In a gas turbine engine, air is pressurized in a compressor and mixed with fuel in a combustor for generating hot combustion gases. The hot gases are channeled through various stages of a turbine which extract energy therefrom for powering the compressor and producing work, such as powering an upstream fan in a typical aircraft turbofan engine application.

The turbine stages include stationary turbine nozzles having a row of hollow vanes which channel the combustion gases into a corresponding row of rotor blades extending radially outwardly from a supporting rotor disk. The vanes and blades have corresponding hollow airfoils with corresponding cooling circuits therein.

The cooling air is typically compressor discharge air which is diverted from the combustion process and, therefore, decreases overall efficiency of the engine. The amount of cooling air must be minimized for maximizing the efficiency of the engine, but sufficient cooling air must nevertheless be used for adequately cooling the turbine airfoils for maximizing their useful life during operation. Each airfoil includes a generally concave pressure sidewall and, an opposite, generally convex suction sidewall extending longitudinally or radially outwardly along a span from an airfoil base to an airfoil tip and axially in chordwise direction between leading and trailing edges. For a turbine blade, the airfoil span extends from a root at the radially inner platform to a radially outer tip spaced from a surrounding turbine shroud. For a turbine vane, the airfoil extends from a root integral with a radially inner band to a radially outer tip integral with an outer band.

Each turbine airfoil also initially increases in thickness aft of the leading edge and then decreases in thickness to a relatively thin or sharp trailing edge where the pressure and suction sidewalls join together. The wider portion of the airfoil has sufficient internal space for accommodating various forms of internal cooling circuits and turbulators for enhancing heat transfer cooling inside the airfoil, whereas, the relatively thin trailing edge has correspondingly limited internal cooling space.

Each airfoil typically includes various rows of film cooling holes extending through the sidewalls thereof which discharge the spent cooling air from the internal circuits. The film cooling holes are typically inclined in the aft direction toward the trailing edge and create a thin film of cooling air over the external surface of the airfoil that provides a thermally insulating air blanket for additional protection against the hot combustion gases which flow over the airfoil surfaces during operation.

The thin trailing edge is typically protected by a row of trailing edge cooling slots which breach the pressure sidewall at a breakout immediately upstream of the trailing edge for discharging film cooling air thereover. Each trailing edge cooling slot has an outlet aperture in the pressure side which begins at a breakout and may or may not be bounded in the radial direction by exposed lands at aft ends of axially extending partitions which define the cooling slots.

The axial partitions may be integrally formed with the pressure and suction sides of the airfoil and themselves must be cooled by the air discharged through the cooling slots defined thereby. The partitions typically converge in the aft direction toward the trailing edge so that the cooling slots diverge toward the trailing edge with a shallow divergence angle that promotes diffusion of the discharged cooling air with little if any flow separation along the sides of the partitions.

Aerodynamic and cooling performance of the trailing edge cooling slots is directly related to the specific configuration of the cooling slots and the intervening partitions. The flow area of the cooling slots regulates the flow of cooling air discharged through the cooling slots, and the geometry of the cooling slots affects cooling performance thereof.

The divergence or diffusion angle of the cooling slots can effect undesirable flow separation of the discharged cooling air which would degrade performance and cooling effectiveness of the discharged air. This also increases losses that negatively impact turbine efficiency. Portions of the thin trailing edge directly under the individual cooling slots are effectively cooled by the discharged cooling air, with the discharged air also being distributed over the intervening exposed lands at the aft end of the partitions. The lands are solid portions of the pressure sidewall integrally formed with the suction sidewall and must rely for cooling on the air discharged from the adjacent trailing edge cooling slots.

Notwithstanding, the small size of the these outlet lands and the substantial cooling performance of the trailing edge cooling slots, the thin trailing edges of turbine airfoils nevertheless typically limit the life of those airfoils due to the high operating temperature thereof in the hostile environment of a gas turbine engine.

Accordingly, it is desired to provide a turbine airfoil having improved trailing edge cooling and cooling slots for improving airfoil durability and engine performance. It is also desired to minimize the amount of cooling flow used for trailing edge cooling in order to maximize fuel efficiency of the turbine and the engine.

SUMMARY OF THE INVENTION

A gas turbine engine turbine airfoil includes widthwise spaced apart pressure and suction sidewalls extending outwardly along a span from an airfoil base to an airfoil tip and extending chordwise between opposite leading and trailing edges. A spanwise row of spanwise spaced apart trailing edge cooling holes encased in the airfoil between the pressure and suction sidewalls end at corresponding spanwise spaced apart trailing edge cooling slots extending chordally substantially to the trailing edge. Each cooling hole includes a spanwise diverging section leading into the trailing edge cooling slot. A plug disposed in the cooling hole extends downstream through at least a portion of the diverging section.

The cooling hole may further include, in downstream serial cooling flow relationship, a curved inlet, a constant area and constant width flow cross section metering section, and the diverging section.

The plug may include a plug dome rising up from a plug base extending along a suction sidewall surface of the suction sidewall. The plug may be spanwise centered in the hole and may include widthwise and spanwise rounded upstream and downstream dome ends.

A flow cross section between the plug and the cooling hole may have a cross sectional flow area equal to a difference between a cross sectional hole area of the cooling hole and a cross sectional plug area of the plug. The cross sectional flow area in the diverging section increases in a downstream direction.

The flow cross section may have two relatively wide rounded lobes at distal ends of a relatively narrow rectangular middle section. A height of the flow cross section increases through an entire length of the diverging section. The lobes extend between pressure and suction sidewall surfaces of the pressure and suction sidewalls respectively in the diverging section. The lobes have a maximum width equal to a width of the diverging section between the pressure and suction sidewall surfaces in the diverging section.

The pressure and suction sidewalls include pressure and suction sidewall surfaces respectively in the hole and the pressure sidewall surface may be planar through the entire metering and diverging sections. The width may be constant through the metering and diverging sections of the hole.

Lands may be disposed between spanwise adjacent ones of the trailing edge cooling slots and slot floors may be disposed in the trailing edge cooling slots between the lands. The lands may be coplanar or flush with an external surface of the pressure sidewall around each of the cooling slots.

The lands may be coplanar or flush with an external surface of the pressure sidewall around each of the cooling slots.

A deck may extend chordwise or downstream from the diverging sections of the cooling holes past the slot floors substantially to the trailing edge. The deck extends spanwise or radially outwardly from a bottommost one of the slot floors to a topmost one of the slot floors. Upper and lower deck sidewalls extend from the deck to the external surface of the pressure sidewall and spanwise bounding the deck.

The plugs may further extend through at least a portion of the trailing edge cooling slot.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
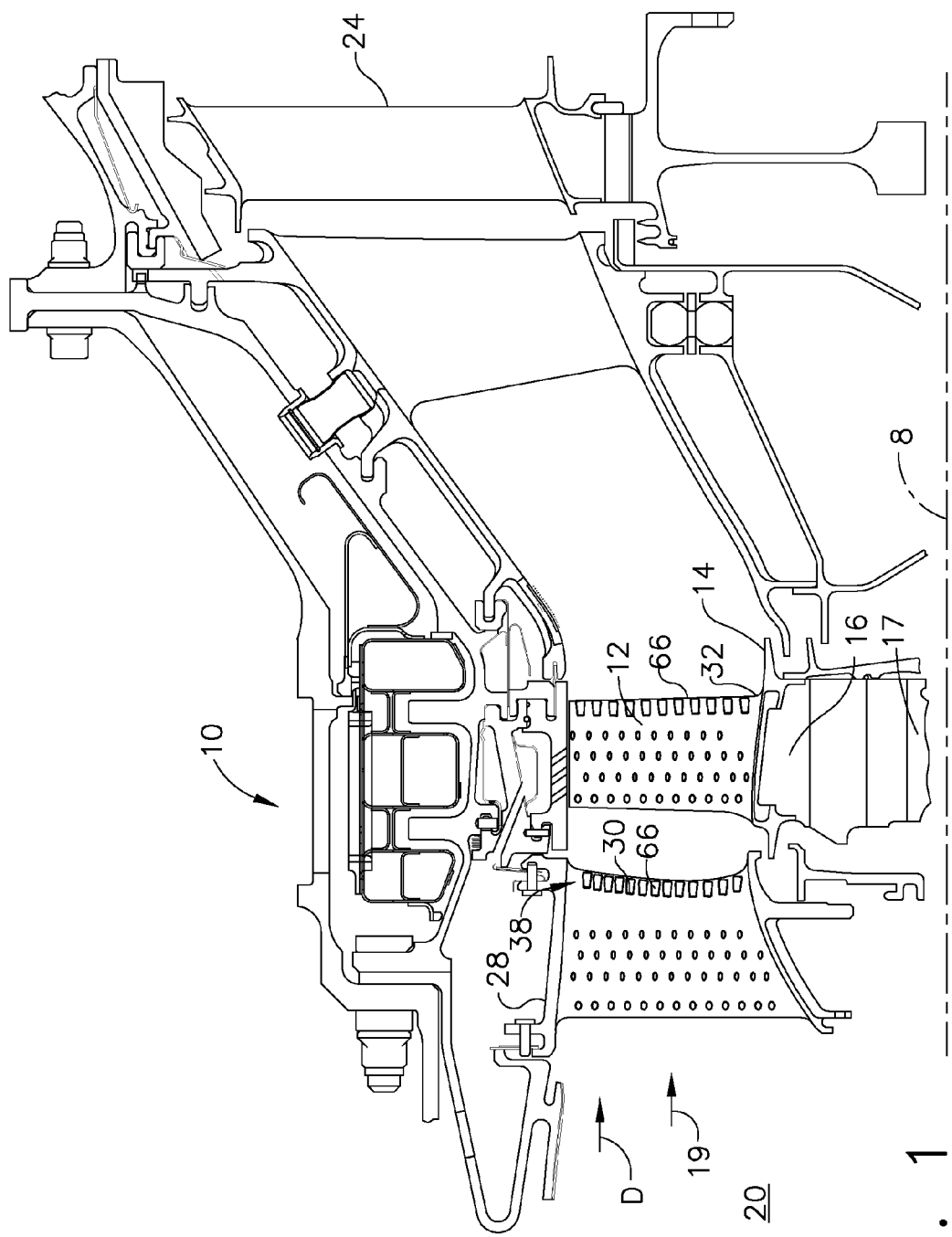
FIG. 1 is a longitudinal, sectional view illustration of an exemplary embodiment of turbine vane and rotor blade airfoils having cooling holes culminating at spanwise spaced apart trailing edge cooling slots.

Illustrated in FIG. 1 is an exemplary gas turbine engine high pressure turbine stage 10 circumscribed about an engine centerline axis 8 and positioned between a combustor 20 and a low pressure turbine (LPT) 24. The combustor 20 mixes fuel with pressurized air for generating hot combustion gases 19 which flows downstream through the turbines.

The high pressure turbine stage 10 includes a turbine nozzle 28 upstream of a high pressure turbine (HPT) 22 through which the hot combustion gases 19 are discharged into from the combustor 20. The exemplary embodiment of the high pressure turbine 22 illustrated herein includes at least one row of circumferentially spaced apart high pressure turbine blades 32. Each of the turbine blades 32 includes a turbine airfoil 12 integrally formed with a platform 14 and an axial entry dovetail 16 used to mount the turbine blade on a perimeter of a supporting rotor disk 17.

Figure 2:
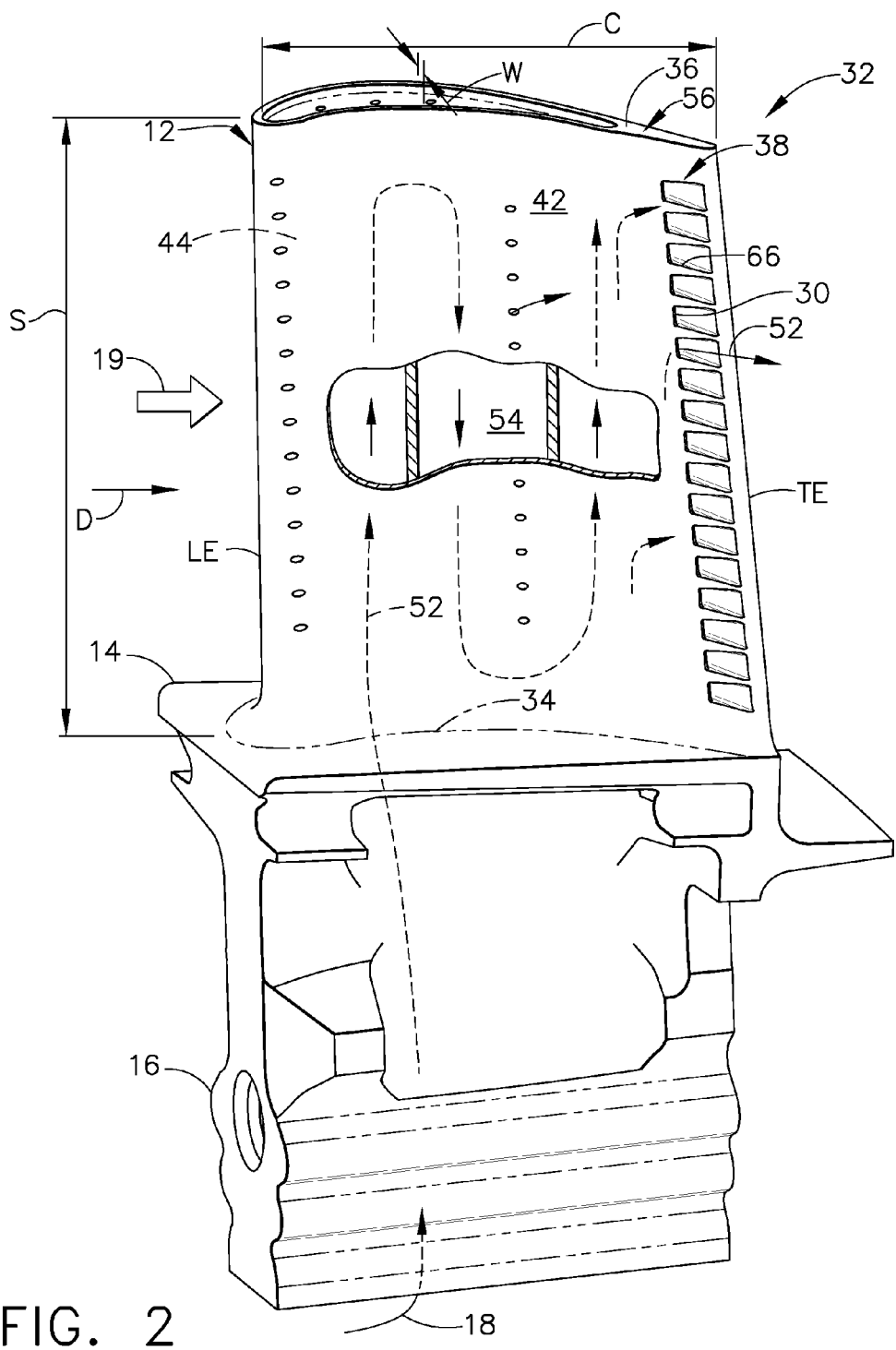
FIG. 2 is an enlarged view of a blade illustrated in FIG. 1.

Referring to FIG. 2, the airfoil 12 extends radially outwardly along a span S from an airfoil base 34 on the blade platform 14 to an airfoil tip 36. During operation, the hot combustion gases 19 are generated in the engine and flow downstream over the turbine airfoil 12 which extracts energy therefrom for rotating the disk supporting the blade for powering the compressor (not shown). A portion of pressurized air 18 is suitably cooled and directed to the blade for cooling thereof during operation.

The airfoil 12 includes widthwise spaced apart generally concave pressure and convex suction sidewalls 42, 44. The pressure and suction sidewalls 42, 44 extend longitudinally or radially outwardly along the span S from the airfoil base 34 to the airfoil tip 36. The sidewalls also extend axially in a chordwise direction C between opposite leading and trailing edges LE, TE. The airfoil 12 is hollow with the pressure and suction sidewalls 42, 44 being spaced widthwise or laterally apart between the leading and trailing edges LE, TE to define an internal cooling cavity or circuit 54 therein for circulating pressurized cooling air or coolant flow 52 during operation. The pressurized cooling air or coolant flow 52 is from the portion of pressurized air 18 diverted from the compressor.

The turbine airfoil 12 increases in width W or widthwise from the leading edge LE to a maximum width aft therefrom and then converges to a relatively thin or sharp trailing edge TE. The size of the internal cooling circuit 54 therefore varies with the width W of the airfoil, and is relatively thin immediately forward of the trailing edge TE where the two sidewalls integrally join together and form a thin trailing edge portion 56 of the airfoil 12. Spanwise spaced apart trailing edge cooling slots 66 are provided at or near this thin trailing edge portion 56 of the airfoil 12 to cool it.

Figure 3:
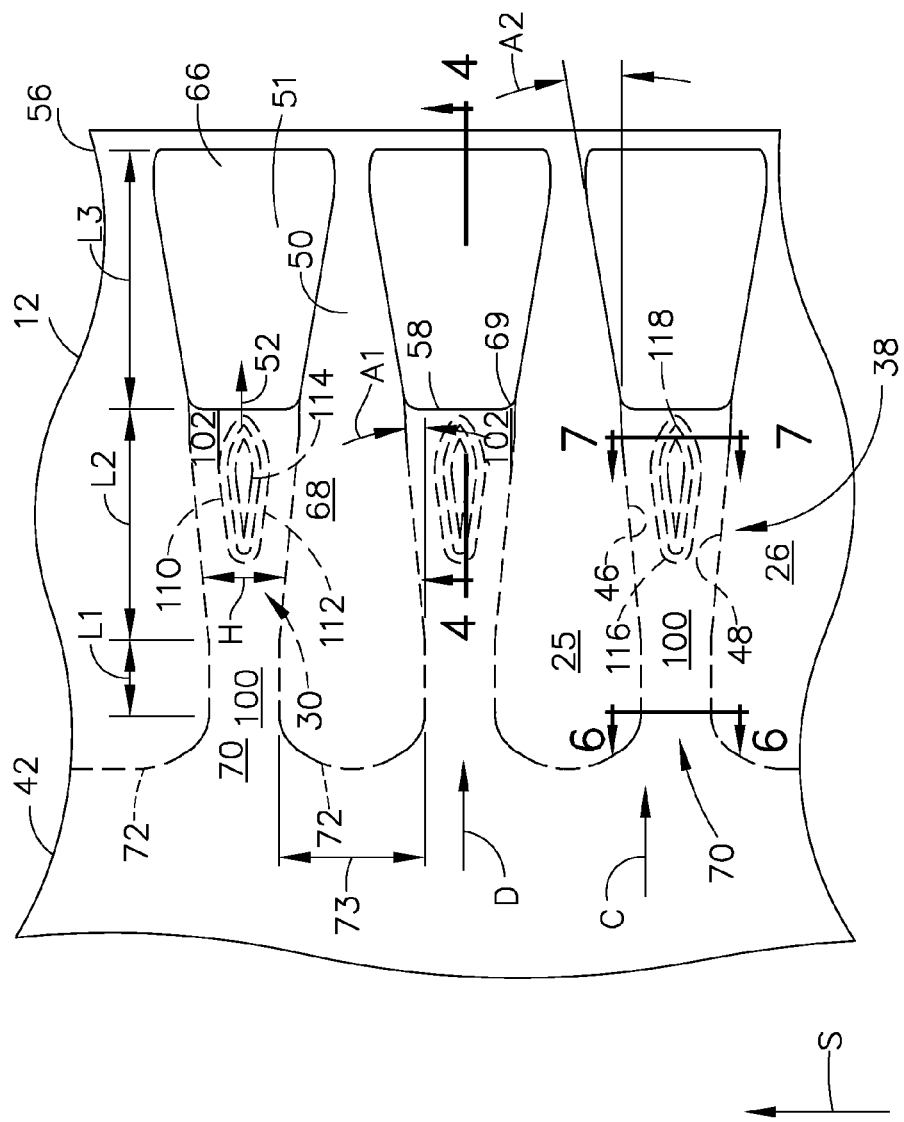
FIG. 3 is a pressure side sectional view of cooling holes with plugs in constant width metering and diffusing sections leading into the trailing edge cooling slots illustrated in FIG. 2.

Referring to FIG. 3, a row 38 of spanwise spaced apart trailing edge cooling holes 30 encased or buried and formed in the airfoil 12 between the pressure and suction sidewalls 42, 44 end at corresponding ones of the spanwise spaced apart trailing edge cooling slots 66. The trailing edge cooling slots 66 extend chordally substantially to the trailing edge TE. The trailing edge cooling holes 30 are disposed along the span S of the trailing edge TE in flow communication with the internal cooling circuit 54 for discharging the coolant flow 52 therefrom during operation.

The trailing edge cooling holes 30 are illustrated in more particularity in FIG. 3. Each cooling hole 30 includes in downstream serial cooling flow relationship, a downstream converging or bellmouth shaped curved inlet 70, a constant area and constant width flow cross section metering section 100, and a spanwise diverging section 102 which leads into the trailing edge cooling slot 66 and supplies the slot with cooling air or coolant flow 52. The trailing edge cooling slot 66 begins at a breakout 58 at a downstream end 69 of the diverging section 102 and the embodiment illustrated herein spanwise diverges. The cooling holes 30 are separated radially along the span S from each other by corresponding axial partitions 68 which extend downstream toward the trailing edge TE. The curved inlet 70 is illustrated herein as downstream converging or, more particularly, a bellmouth inlet.

The inlet 70 is defined at and between forward ends 72 of the partitions 68. The partitions 68 include semi-circular forward ends 72 having diameters 73 that define the bellmouth inlet 70. Each of the cooling holes 30 includes spanwise spaced apart upper and lower hole surfaces 46, 48 along a corresponding adjacent pair of upper and lower ones 25, 26 of the axial partitions 68. A spanwise height H of the hole 30 is defined between the upper and lower hole surfaces 46, 48 of the upper and lower ones 25, 26 of the axial partitions 68 as illustrated in FIG. 3. The metering section 100, the diverging section 102, and the trailing edge cooling slot 66 have downstream extending first, second, and third lengths L1, L2, and L3 respectively as illustrated in FIG. 3.

Figure 4:
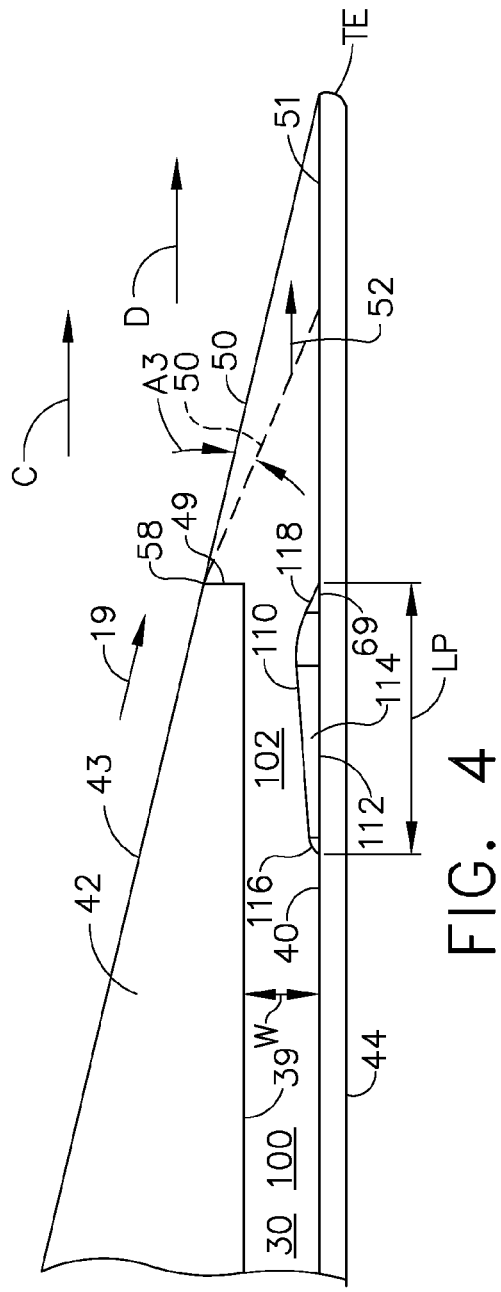
FIG. 4 is a cross sectional schematical view of the trailing edge cooling slots and the cooling holes taken through 4-4 in FIG. 3.
Figure 5:
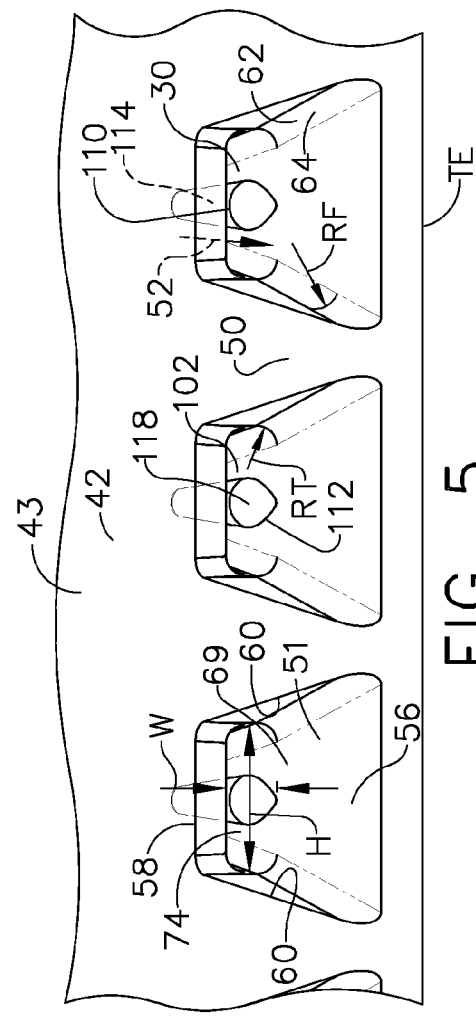
FIG. 5 is an upstream looking perspective view of the trailing edge cooling slots illustrated in FIG. 3.

Referring to FIGS. 3-5, a hole width W of the hole 30 is defined between pressure and suction sidewall surfaces 39, 40 of the pressure and suction sidewalls 42, 44 respectively in the hole 30 as illustrated in FIG. 4. The trailing edge cooling slots 66 include a slot floor 51 open and exposed to the hot combustion gases 19 that pass through the high pressure turbine 22. The slot floor 51 extends for the entire third length L3 along the suction sidewall 44.

Figure 6:
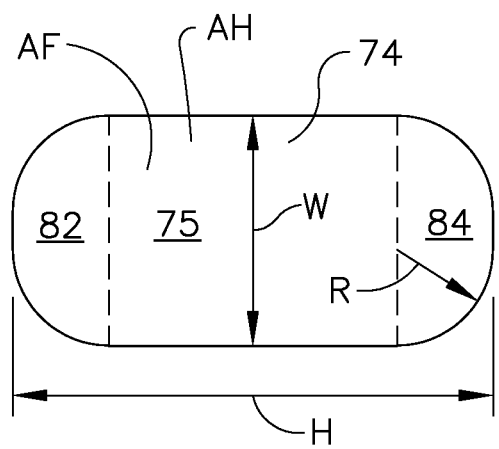
FIG. 6 is a cross sectional schematical view of an elongated flow cross section in the constant width metering section taken through 6-6 in FIG. 3.
Figure 7:
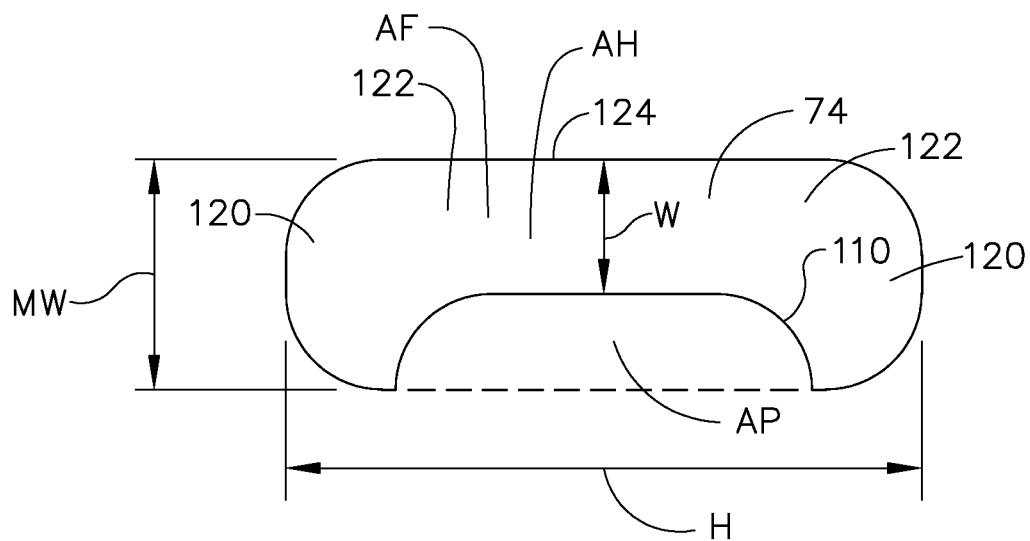
FIG. 7 is a cross sectional schematical view of an elongated flow cross section in the diffusing section taken through 7-7 in FIG. 3.
Figure 8:
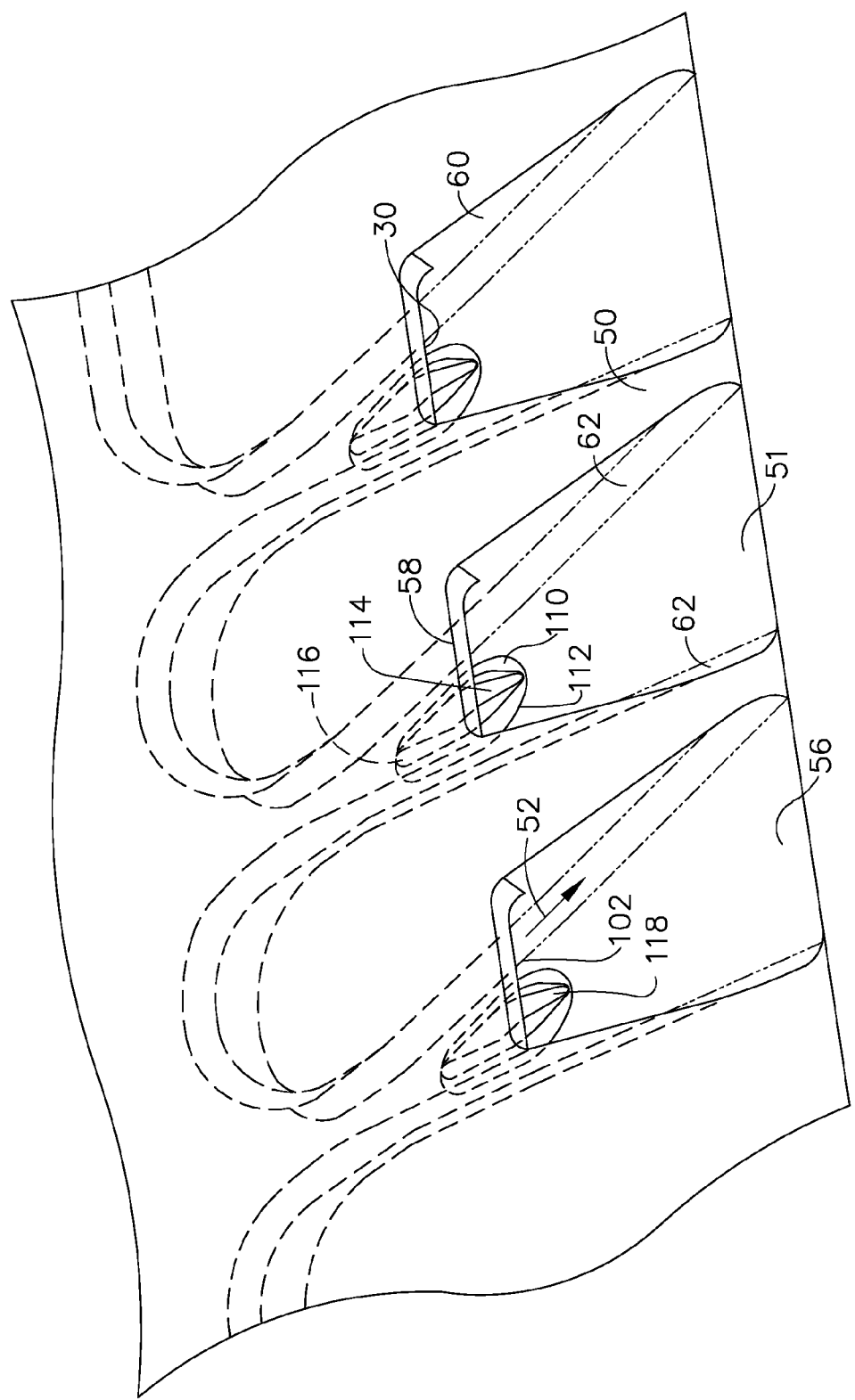
FIG. 8 is a perspective view of the cooling holes and plugs illustrated in FIG. 3.

The adjacent pair of upper and lower ones 25, 26 of the axial partitions 68 and the pressure and suction sidewalls 42, 44 spanwise bound the hole 30. Referring to FIGS. 6 and 7, the cooling hole 30 has a generally spanwise elongated flow cross section 74 and the spanwise height H is substantially greater than the hole width W. The cooling hole 30 has a height to width ratio H/W in a range of about 2:1 to 10:1 (see FIGS. 4-10). The pressure and suction sidewall surfaces 39, 40 of the pressure and suction sidewalls 42, 44 respectively widthwise bound the hole 30.

The embodiment of the cooling hole 30 illustrated in FIG. 4 has a fixed or constant width W through the cooling hole 30 and the pressure and suction sidewall surfaces 39, 40 are parallel through the entire first and second lengths L1, L2 of the cooling hole 30. The pressure sidewall surface 39 is flat or planar through the entire metering and diverging sections 100, 102 and their corresponding first and second lengths L1, L2 of the cooling hole 30. In this embodiment of the cooling hole 30, the suction sidewall surface 40 is flat or planar through the entire metering and diverging sections 100, 102 and their corresponding first and second lengths L1, L2 of the cooling hole 30. The slot floor 51 is coplanar with suction sidewall surface 40 in the hole 30. The inlet 70, the metering section 100, and the diverging section 102 have the same hole width W or are of constant width W in the embodiment of the trailing edge cooling holes 30 illustrated in FIG. 3 and schematically illustrated in solid line in FIG. 4. The diverging section 102 diverges in a spanwise direction.

The diverging sections 102 of the cooling holes 30 lead into the trailing edge cooling slots 66 which breach the external surface 43 of the pressure sidewall 42 at a breakout lip 49 spaced forward or upstream from the trailing edge TE. Each trailing edge cooling slot 66 is radially or spanwise bounded by exposed lands 50 forming the aft ends of the corresponding partitions 68, with the forward ends of the partitions extending forward or upstream toward the leading edge from the corresponding breakout lips 49. One embodiment of the lands 50, illustrated in solid line in FIG. 4, are coplanar or flush with the external surface 43 of the pressure sidewall 42 around each of the exposed cooling slot 66, including the common breakout lip 49 extending radially therebetween. This maximizes flow continuity of the pressure side of the airfoil.

Slot surfaces 60 extend widthwise between the lands 50 and the slot floors 51. Fillets 62 in slot corners 64 between the lands 50 and the slot floors 51 have fillet radii RF that may be substantially the same size as bottom corner radii RT of the flow cross section 74 of the diverging sections 102 adjacent the bottom corner radii RT. The fillet radii RF helps with castability of the trailing edge cooling slots 66. The fillet radii RF helps improve cooling of the lands 50 by redistributing coolant flow 52 in the trailing edge cooling slots from the slot floor 51 to the lands 50 in order to make coolant flow 52 film coverage on the slot floors 51 and the lands 50 more uniformly.

Figure 11:
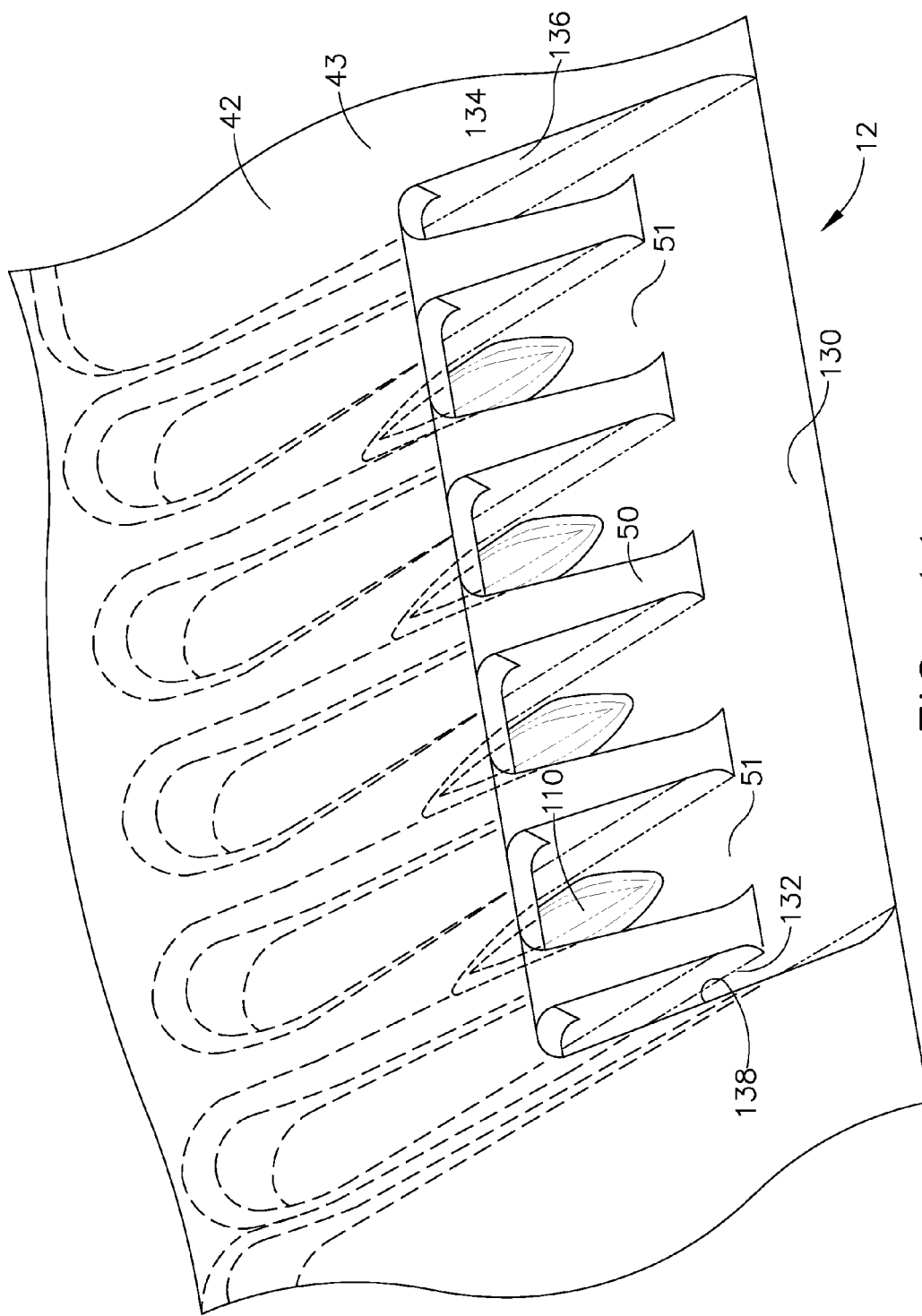
FIG. 11 is a perspective view of the cooling holes and plugs illustrated in FIG. 9 with shorter lands between the slots.

Another embodiment of the lands 50 is illustrated in dashed line in FIGS. 4 and 11 and provides for the lands 50 not being coplanar or flush with the external surface 43 of the pressure sidewall 42 around each of the exposed cooling slot 66. The lands 50 may be more angled towards the slot floor 51 and away from the external surface 43 of the pressure sidewall 42. The lands 50 may be angled away from the external surface 43 by a land angle A3 in a range between 0-5 degrees and the lands 50 may intercept the slot floor 51 upstream of the trailing edge TE. This shorter land embodiment of the airfoil further includes a deck 130, further illustrated in FIG. 11, which in turn provides structure and a surface for the slot floor 51. The deck 130 extends chordwise or downstream from the diverging sections 102 of the cooling holes 30 past the slot floors 51 substantially to the trailing edge TE. The deck 130 extends spanwise or radially outwardly from a bottommost 132 one of the slot floors 51 to a topmost 134 one of the slot floors 51 and includes all of the slot floors 51. The deck 130 is spanwise bound by upper and lower deck sidewalls 136, 138 which extend from the deck 130 to the external surface 43 of the pressure sidewall 42.

Referring to FIGS. 3-5, and 8, aerodynamically shaped plugs 110 are disposed in the cooling holes 30. The plugs 110 extend downstream through at least a portion of the diverging section 102. The plugs 110 include a plug dome 114 rising up from a plug base 112. The plug dome 114 includes widthwise and spanwise rounded upstream and downstream dome ends 116, 118. The spanwise height H of the plug base is less than the spanwise height H of the cooling hole along a plug length LP of the plug 110. The plug 110 is spanwise centered in the hole 30. The plug bases 112 are illustrated herein as extending along the suction sidewall surfaces 40 of the suction sidewalls 44. Alternatively, the plug bases 112 may extend along the pressure sidewall surfaces 39 of the pressure sidewalls 42. The plug 110 provides control of the rate of expansion of the area flow cross section 74 in the diverging section 102 of the cooling hole 30. The plug 110 helps maintain stable diffuser flow along the cooling hole surfaces i.e. prevents or reduces flow separation and turbulence along the pressure and suction sidewall surfaces 39, 40 of the pressure and suction sidewalls 42, 44 respectively in the diverging section 102. The plug 110 allows the divergence of the upper and lower hole surfaces 46, 48 of the upper and lower ones 25, 26 of the axial partitions 68 in the diverging section 102 to be greater than without the plug, and still maintain attached and stable coolant flow 52 through the diverging section 102. The flow cross section 74 increases in area through the entire second length L2 of the diverging section 102 but the rate of this increase is controlled by the plug 110. The plug 110 is three dimensionally shaped or contoured to maintain attached and stable coolant flow 52 and prevent separation along the upper and lower hole surfaces 46, 48 of the upper and lower ones 25, 26 of the axial partitions 68 through the diverging section 102.

The cooling hole 30 has a cross sectional hole area AH and the plug 110 has a cross sectional plug area AP. The flow cross section 74 between the plug 110 and the cooling hole 30 has a cross sectional flow area AF equal to the difference between the hole area AH and the plug area AP. The cross sectional flow area AF of the flow cross section 74 in the diverging section 102 increases in the downstream direction. The cross sectional flow area AF of the flow cross section 74 in the metering section 100 and in any portion of the diverging section 102 upstream of the plug 110 is the cross sectional hole area AH of the cooling hole 30.

The embodiment of the flow cross section 74 in the metering section 100 and in any portion of the diverging section 102 upstream of the plug 110 is illustrated in FIGS. 3-6 as having a race track shaped flow cross section 74 with the rectangular section 75 between spanwise or radially spaced apart rounded or semi-circular inner and outer end sections 82, 84. The race track shaped flow cross section 74 illustrated herein is spanwise elongated, has four equal corner radii R, and has a preferred width to height ratio W/H in a range of 0.15-0.50.

The embodiment of the flow cross section 74 in a portion of the diverging section 102 having the plug 110 illustrated in FIG. 7 may generally be described as having two relatively wide rounded lobes 120 at distal ends 122 of a relatively narrow rectangular middle section 124. The height H of the flow cross section 74 increases through the entire length of the diverging section 102. The width W of the flow cross section 74 is constant where there is no plug 110 and varies across the height H of the flow cross section 74 where there is a plug 110 as illustrated in FIG. 7. The lobes 120 have a maximum width MW equal to the width W of the diverging section 102 as measured between the pressure and suction sidewall surfaces 39, 40 of the pressure and suction sidewalls 42, 44 respectively. The lobes 120 extend between the pressure and suction sidewall surfaces 39, 40 of the pressure and suction sidewalls 42, 44 respectively in the diverging section 102. The lobes 120 are substantially wider than the middle section 124. The lower hole surface 48 of the lower ones 26 of the axial partitions 68 is substantially wider than the plug base 112 along the diverging section 102 where the plug 110 is located. This provides for the coolant flow 52 to pass between and cool the plug 110 and the pressure and suction sidewall surfaces 39, 40 of the pressure and suction sidewalls 42, 44 respectively in the diverging section 102.

The cooling holes 30, trailing edge cooling slots 66, and lands 50 are cast in cooling features. Casting these features provides good strength, low manufacturing costs, and durability for the airfoil and blades and vanes. The race track shaped flow cross section 74 with the rectangular section 75 between spanwise or radially spaced apart rounded or semi-circular inner and outer end sections 82, 84 provides good cooling flow characteristics which reduces the amount of the coolant flow 52 needed to cool the airfoils. The corner radii R contribute to good cooling, castability, and strength of these cooling features and in particular help cool the lands 50 thus reducing the amount of the coolant flow 52 used.

The embodiments of the cooling hole 30 and the trailing edge cooling slot 66 illustrated in FIGS. 3 and 5 includes a diverging trailing edge cooling slot 66. The diverging section 102 and the trailing edge cooling slot 66 may diverge at different first and second diverging angles A1, A2 as illustrated in FIG. 3. The spanwise height H of the diverging section 102 and the trailing edge cooling slot 66 increases in the downstream direction D. A more favorable flow angle relative to the lands for getting coolant flow 52 onto the lands at the breakout is set up by the expansion angle A1 of the diverging section 102 of the slot, and the relative angle between the external diverging section 66, i.e., A2☐A1. The plug also contributes to forcing cooling flow from the slot floor onto the lands.

The spanwise elongated metering section 100 with the constant width W is sized to control the quantity of coolant flow 52 to benefit the engine cycle. The spanwise elongated metering section 100 and diverging section 102 expand the flow coverage at the breakout 58, redistributes coolant flow 52 in the trailing edge cooling slots 66 from the slot floor 51 to the lands 50 in order to make coolant flow 52 film coverage on the slot floors 51 and the lands 50 more uniform. The constant width W metering section 100 upstream of the diverging section 102 of the hole 30 helps keep the coolant flow 52 fully attached in the diverging section 102.

This in turn allows an increase surface area of the slot floor 51 and decrease in surface area of the lands 50. The constant width W metering section 100 and diverging section 102 helps set up a more favorable flow angle at the breakout relative to the lands 50 to get more coolant flow 52 onto the lands. The planar pressure sidewall surface 39 through the entire first and second lengths L1, L2 of the cooling hole 30 also helps set up a more favorable flow angle at the breakout relative to the lands 50 to get more coolant flow 52 onto the lands.

The constant width and separately the planar pressure sidewall surface 39 of the cooling hole 30 helps keep a coolant velocity of the coolant flow 52 and a gas velocity of the hot combustion gases along the external surface 43 of the pressure sidewall 42 at the breakout about equal to minimize aero losses which could result in a negative effect on turbine efficiency. These two features also help keep the coolant flow 52 flow attached in the expansion section of the slot 66.

Figure 9:
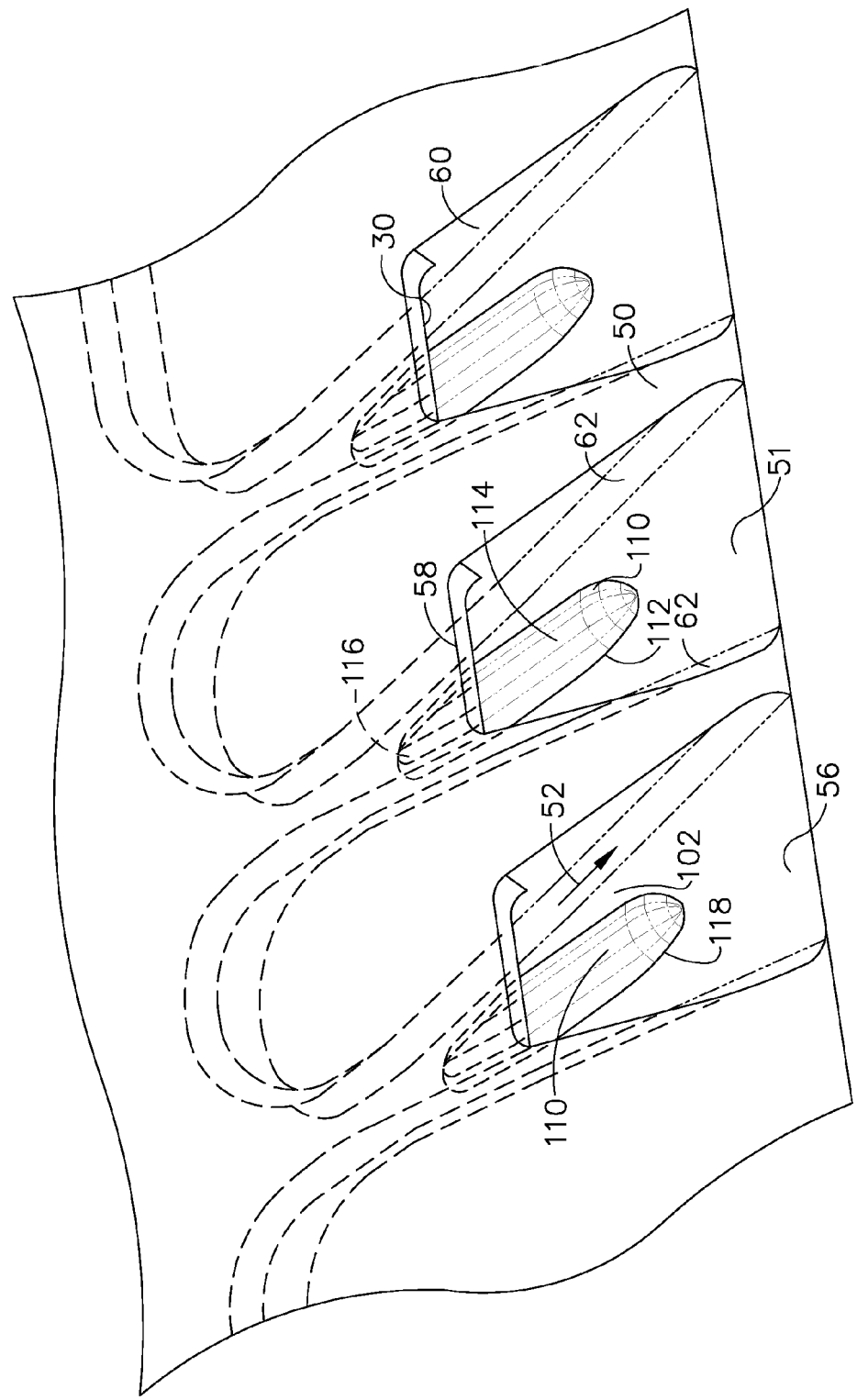
FIG. 9 is a perspective view of the cooling holes and alternative plugs extending into the trailing edge cooling slots illustrated in FIG. 3.
Figure 10:
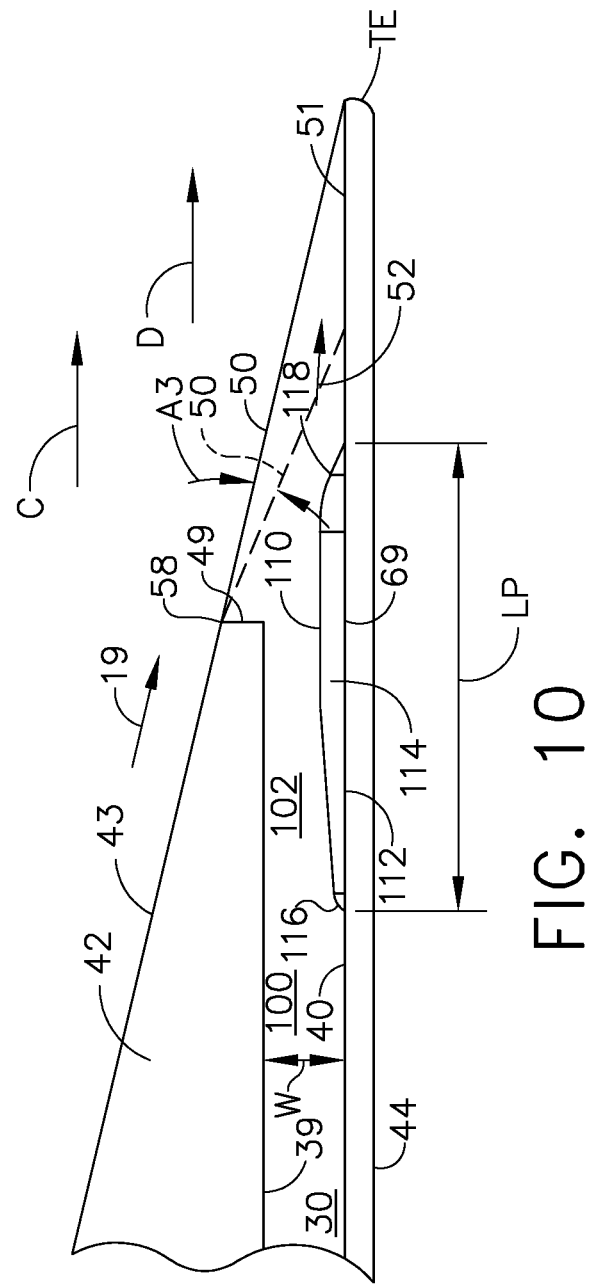
FIG. 10 is a cross sectional schematical view of the trailing edge cooling slots and the cooling holes illustrated in FIG. 9.

Referring to FIGS. 9-10, the aerodynamically shaped plugs 110 disposed in the cooling holes 30 are extended plugs which extend further downstream through at least a portion of the diverging sections 102 and at least a portion of the trailing edge cooling slots 66.

The plug creates an aerodynamic flow blockage in the diffusing section, i.e., reduced flow area for a given coolant flow rate. This allows the diffuser expansion angle to be increased, and still maintain stable, attached flow in the diffuser. The higher diffuser expansion results in a smaller hot land surface area and larger cold slot floor surface area. The plug also keeps the coolant velocity up at the slot exit. For the same coolant flow rate, a diffuser without a plug has a lower slot exit velocity than one with a plug. This is important for limiting the aerodynamic losses due to mixing of the hot gas and coolant streams, which is a function of the ration of coolant velocity to external gas velocity. The closer this ratio is to 1, the lower the mixing loss. The plug aids in keeping cooling flow velocity high, while still reducing the cooling flow. The plug sets up a very favorable flow angle and vortex condition for pushing coolant flow onto the lands, giving much higher land film effectiveness. The extended plug accentuates this effect. The shorter lands allow coolant to merge at the trailing edge, giving better film effectiveness. The increased land angle enables better coolant flow roll-up onto the lands. There is also a reduction in hot land surface area.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine turbine airfoil comprising:
widthwise spaced apart pressure and suction sidewalls extending outwardly along a span from an airfoil base to an airfoil tip;
the pressure and suction sidewalls extending chordwise between opposite leading and trailing edges;
a spanwise row of spanwise spaced apart trailing edge cooling holes encased in the airfoil between the pressure and suction sidewalls and ending at corresponding spanwise spaced apart trailing edge cooling slots extending chordally substantially to the trailing edge;
each of the cooling holes including a spanwise diverging section leading into the trailing edge cooling slot; and
a plug disposed in each of the cooling holes and the plug extending downstream through at least a portion of the diverging section, the plug further comprising a plug dome rising up from a plug base of the plug and the plug base extending along a suction sidewall surface of the suction sidewall, the plug being spanwise centered in the hole and including widthwise and spanwise rounded upstream and downstream dome ends.

2. The airfoil as claimed in claim 1 further comprising:
a flow cross section between the plug and the cooling hole, the flow cross section having a cross sectional flow area equal to a difference between a cross sectional hole area of the cooling hole and a cross sectional plug area of the plug, and
the cross sectional flow area in the diverging section increasing in a downstream direction.

3. The airfoil as claimed in claim 2 further comprising:
the flow cross section between the plug and the cooling hole having two relatively wide rounded lobes at distal ends of a relatively narrow rectangular middle section,
a height of the flow cross section increasing through an entire length of the diverging section,
the lobes extending between pressure and suction sidewall surfaces of the pressure and suction sidewalls respectively in the diverging section, and
the lobes having a maximum width equal to a width of the diverging section between the pressure and suction sidewall surfaces in the diverging section.

4. The airfoil as claimed in claim 3 further comprising the lobes being substantially wider than the middle section.

5. The airfoil as claimed in claim 2 further comprising lands disposed between spanwise adjacent ones of the trailing edge cooling slots and slot floors in the trailing edge cooling slots between the lands.

6. The airfoil as claimed in claim 5 further comprising the lands being coplanar or flush with an external surface of the pressure sidewall around each of the cooling slots.

7. The airfoil as claimed in claim 6 further comprising:
a deck extending chordwise or downstream from the diverging sections of the cooling holes past the slot floors substantially to the trailing edge,
the deck extending spanwise or radially outwardly from a bottommost one of the slot floors to a topmost one of the slot floors, and
upper and lower deck sidewalls extending from the deck to the external surface of the pressure sidewall and spanwise bounding the deck.

8. The airfoil as claimed in claim 1 further comprising the plugs further extending through at least a portion of the trailing edge cooling slot.

9. A gas turbine engine turbine airfoil comprising:
widthwise spaced apart pressure and suction sidewalls extending outwardly along a span from an airfoil base to an airfoil tip;
the pressure and suction sidewalls extending chordwise between opposite leading and trailing edges;
a spanwise row of spanwise spaced apart trailing edge cooling holes encased in the airfoil between the pressure and suction sidewalls and ending at corresponding spanwise spaced apart trailing edge cooling slots extending chordally substantially to the trailing edge;
each of the cooling holes including in downstream serial cooling flow relationship, an inlet, a metering section with a constant area and constant width flow cross section, and a spanwise diverging section leading into the trailing edge cooling slot; and
a plug disposed in each of the cooling holes and the plug extending downstream through at least a portion of the diverging section, the plug further comprising a plug dome rising up from a plug base of the plug and the plug base extending along a suction sidewall surface of the suction sidewall, the plug being spanwise centered in the hole and including widthwise and spanwise rounded upstream and downstream dome ends.

10. The airfoil as claimed in claim 9 further comprising:
a flow cross section between the plug and the cooling hole, the flow cross section having a cross sectional flow area equal to a difference between a cross sectional hole area of the cooling hole and a cross sectional plug area of the plug, and
the cross sectional flow area in the diverging section increasing in a downstream direction.

11. The airfoil as claimed in claim 10 further comprising:
the flow cross section between the plug and the cooling hole having two relatively wide rounded lobes at distal ends of a relatively narrow rectangular middle section,
a height of the flow cross section increasing through an entire length of the diverging section,
the lobes extending between pressure and suction sidewall surfaces of the pressure and suction sidewalls respectively in the diverging section, and
the lobes having a maximum width equal to a width of the diverging section between the pressure and suction sidewall surfaces in the diverging section.

12. The airfoil as claimed in claim 11 further comprising the lobes being substantially wider than the middle section.

13. The airfoil as claimed in claim 12 further comprising lands disposed between spanwise adjacent ones of the trailing edge cooling slots and slot floors in the trailing edge cooling slots between the lands.

14. The airfoil as claimed in claim 13 further comprising the lands being coplanar or flush with an external surface of the pressure sidewall around each of the cooling slots.

15. The airfoil as claimed in claim 13 further comprising:
a deck extending chordwise or downstream from the diverging sections of the cooling holes past the slot floors substantially to the trailing edge,
the deck extending spanwise or radially outwardly from a bottommost one of the slot floors to a topmost one of the slot floors, and
upper and lower deck sidewalls extending from the deck to the external surface of the pressure sidewall and spanwise bounding the deck.

16. The airfoil as claimed in claim 9 further comprising:
the cooling hole having a spanwise height substantially greater than a hole width through the cooling hole,
pressure and suction sidewall surfaces of the pressure and suction sidewalls respectively in the hole, and
the pressure sidewall surface being planar through the entire metering and diverging sections.

17. The airfoil as claimed in claim 16 further comprising:
a flow cross section between the plug and the cooling hole,
the flow cross section having a cross sectional flow area equal to a difference between a cross sectional hole area of the cooling hole and a cross sectional plug area of the plug, and
the cross sectional flow area in the diverging section increasing in a downstream direction.

18. The airfoil as claimed in claim 17 further comprising:
the flow cross section between the plug and the cooling hole having two relatively wide rounded lobes at distal ends of a relatively narrow rectangular middle section,
a height of the flow cross section increasing through an entire length of the diverging section,
the lobes extending between pressure and suction sidewall surfaces of the pressure and suction sidewalls respectively in the diverging section, and
the lobes having a maximum width equal to a width of the diverging section between the pressure and suction sidewall surfaces in the diverging section.

19. The airfoil as claimed in claim 18 further comprising the lobes being substantially wider than the middle section.

20. The airfoil as claimed in claim 19 further comprising lands disposed between spanwise adjacent ones of the trailing edge cooling slots and slot floors in the trailing edge cooling slots between the lands.

21. The airfoil as claimed in claim 20 further comprising the lands being coplanar or flush with an external surface of the pressure sidewall around each of the cooling slots.

22. The airfoil as claimed in claim 20 further comprising:
a deck extending chordwise or downstream from the diverging sections of the cooling holes past the slot floors substantially to the trailing edge,
the deck extending spanwise or radially outwardly from a bottommost one of the slot floors to a topmost one of the slot floors, and
upper and lower deck sidewalls extending from the deck to the external surface of the pressure sidewall and spanwise bounding the deck.

23. The airfoil as claimed in claim 22 further comprising the width being constant through the metering section of the hole.

24. The airfoil as claimed in claim 20 further comprising:
the lobes having corner radii,
fillets in slot corners between the lands and the slot floors, and
the fillets having fillet radii substantially the same size as the corner radii of the lobes.

25. The airfoil as claimed in claim 24 further comprising the diverging section and the trailing edge cooling slot diverging at different first and second diverging angles respectively.

26. The airfoil as claimed in claim 25 further comprising the plugs further extending through at least a portion of the trailing edge cooling slot.

27. The airfoil as claimed in claim 9 further comprising the metering and diverging sections having a hole height to hole width ratio of the spanwise height and the hole width in a range of about 2:1 to 10:1.

* * * * *